United States Patent Office 2,916,986
Patented Dec. 15, 1959

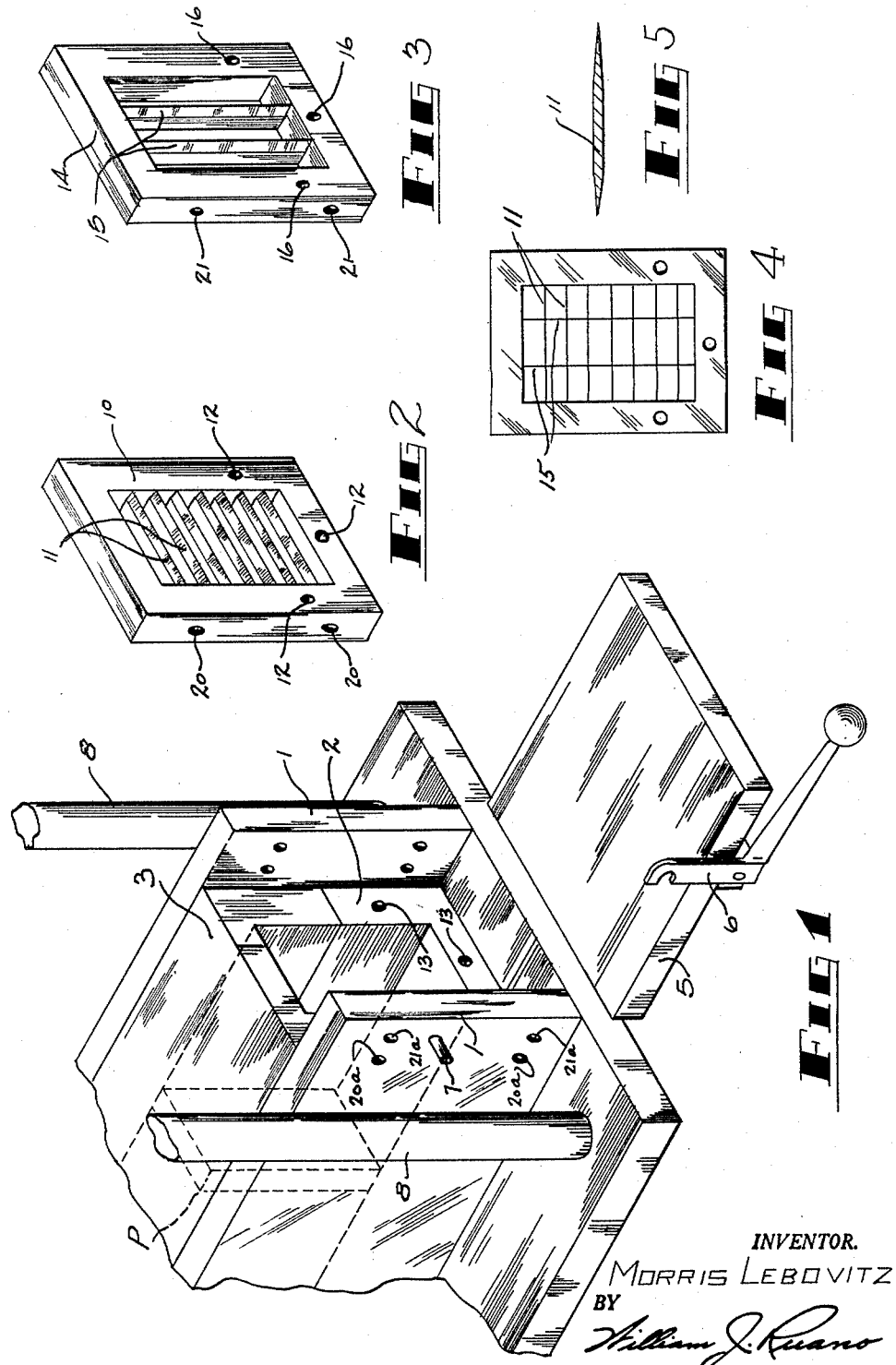

2,916,986

MACHINE FOR STRIPPING FROZEN FISH

Morris Lebovitz, Pittsburgh, Pa., assignor to Lebo Press Co., Pittsburgh, Pa.

Application June 4, 1954, Serial No. 434,586

1 Claim. (Cl. 100—94)

My invention relates to a machine for forming and cutting frozen fish into strips ready for packaging for retail sales, and more particularly relates to a hydraulic press and cutter or stripper attachment for compressing frozen fish and slicing it vertically and horizontally into a multiplicity of strips in a single slicing operation.

The conventional method of cutting frozen fish into small strips of the size commonly used in packaging frozen fish sticks for retail sales has been to take larger chunks of frozen fish and slicing them by a band saw, cutting the chunks first along one side into strips and afterwards cutting them along another side at right angles, much the same way as strips of wood are sawed from logs. This method has many outstanding disadvantages, particularly the excessive waste attendant the sawing operations which is similar to sawdust in wood cutting, and the time consuming operations of cutting the large pieces into very small strips, which increase the cost appreciably. Also the strips are not uniformly sized nor of uniform density or compactness.

An object of my invention is to provide a novel machine for pressing frozen fish so as to eliminate air pockets and thereafter cutting the frozen fish into a multiplicity of strips in a single cutting operation while still in the press, thus considerably reducing the time necessary for forming such strips for the retail frozen food trade.

A more specific object of my invention is to provide an attachment for a hydraulic press, which attachment is in the form of grilled knives for cutting fish, while in the dies of the press, in both vertical and horizontal directions so as to form strips of small width and length as the compacted or compressed fish is withdrawn from the press.

Other objects and advantages of my invention will become apparent from a study of the following description taken with the accompanying drawing wherein:

Figure 1 is a perspective view of a portion of a hydraulic press and dies showing the press door in the open position with the cutter attachments removed;

Figure 2 is a perspective view of a horizontally grilled knife attachment which is placed within the press alongside the dies in Figure 1;

Figure 3 is a perspective view of a vertically grilled knife attachment adapted to be disposed next to the attachment shown in Figure 2 and within the press shown in Figure 1;

Figure 4 is an end view of the attachments shown in Figures 2 and 3 when placed in side-by-side position; and Figure 5 is an enlarged cross sectional view of one of the horizontal knives of Figure 2.

In my prior Patent No. 2,565,245 dated August 21, 1951, on Method and Means for Shaping Meats, I have shown and described a hydraulic press for pressing frozen meats into a compact cylindrical shape, devoid of air pockets, preparatory for slicing into the form of meat patties.

Since the present invention employs the same press as shown and described in said patent, reference may be made thereto concerning the details of construction and operation of the press. The present invention, however, is directed to a knife or stripper attachment for insertion in the end portion of the press adjacent the dies for cutting the compressed frozen foods, such as meat or fish, into strips as the compressed food leaves the press. Referring more particularly to the drawing, numerals 1, 1 denote side plates or vertical guides for enclosing a stationary bottom die 2 and a vertically reciprocable top die 3, both of which dies are substantially U-shaped in cross section with their extremities adapted to come in abutment. Guide posts 8, 8 are adapted to guide the vertical movements of die 3. By any conventional hydraulic means, such as that shown in my former patent, the top die 3 may be moved with excessive force toward the bottom die 2 so as to compress frozen meat or frozen fish to conform to the shape of the inner surfaces of the die halves. At this time the cutter attachments shown in Figures 2 and 3 are enclosed within the right end portion of the press and door 5 is latched in the closed position. While die halves of semi-circular cross section are shown in my prior patent, I desire to make them of rectangular shape, instead, so as to be more suitable for shaping frozen fish which is to be stripped. After the die halves are brought together to compress the frozen fish while below freezing temperature and eliminate air pockets and to provide a rectangular cross section throughout the length of the frozen fish slab, a hydraulic piston P of square shape, shown in dotted lines, is pressed against the left end of the frozen fish slab to force the slab against the cutter units shown in Figures 2 and 3 enclosed within the end portion of the press. But the hinged door 5 is now in the open position, that is with the latch 6 unhooked from element 7. Thus the fish is also compressed longitudinally to minimum length with its ends flat and squared off. However, further movement of piston P forces the fish slab against the horizontally grilled knives shown in Figure 2 comprising a frame 10 and a plurality of knives 11 disposed in spaced horizontal relationship. Bolts are inserted through holes 12 and the threaded end of such bolts are screwed to corresponding holes 13 formed in the bottom die so as to rigidly attach the unit shown in Figure 2 to the face of the lower die 2. Immediately adjacent the cutter unit shown in Figure 2 there is placed a vertically grilled cutting or stripping unit shown in Figure 3 which comprises a frame 14 and a plurality of parallel spaced vertically disposed knives 15. Holes 16 are disposed in registry with holes 12 so that the same bolts, described above, may extend through both holes 16 and 12 for securing the two cutter units to the end face of the lower die. On the outer edges of the units shown in Figures 2 and 3 are holes 20 and 21 which are adapted to come into registry with holes 20a and 21a on the sides of end plates 1 to allow insertion of bolts through the sides to firmly anchor the cutting units in place.

The cutting units of Figures 2 and 3 are constructed so that the frame may be taken apart and the knives individually sharpened or cleaned if desired, although the knives may be sharpened even while mounted on the frames.

For some applications it is possible to confine the vertical and horizontal knives of the units shown in Figures 2 and 3 into a single unit of grid formation as shown in Figure 4. However, an outstanding disadvantage of this arrangement is that it makes sharpening of the knives difficult without taking all the knives apart, also it is necessary to slot the knives to arrange them in the pattern shown in Figure 4 which weakens the knives structurally.

In operation, after the frozen fish slab or a plurality of such slabs have been compressed by the die, the compressed rectangular slab is forced against the cutting unit shown in Figure 2 by movement of the piston P in a direction towards such unit. The forward end of the frozen fish slab will be forced against knives 11 which effects cutting thereof into strips stacked horizontally. As shown in Figure 5 the forward edge of the knives are downwardly tapered to tend to bring the cut strips together and prevent separation. And as these strips engage the vertical knives 15 of the unit shown in Figure 3 they are cut again, but in a vertical direction, so as to form strips of substantially square cross section, or, more specifically, of the cross section shown in Figure 4. If nine spaces are provided in the unit shown in Figure 2 and three spaces in the unit shown in Figure 3 it will be apparent that the fish slab will be subdivided into 27 strips along the pattern shown in Figure 4 and that this subdivision takes place in a single longitudinal movement of the slab in a direction away from the end of the dies. Of course it will be apparent that any number of knives may be used in the unit shown in Figures 2 and 3 to obtain any desired number of strips, or any desired subdivision, most convenient for the size preferable for packaging for the retail frozen fish trade.

Best results for compressing the frozen fish within the dies and for slicing the fish into small strips are obtained by maintaining the fish slab below freezing temperature, preferably in the range of between 26° to 29° F. This enables the fish to retain its compressed shape and to be of optimum consistency to permit cutting as the slab is ejected from the end opening of the press.

While the above attachments have been described in connection with frozen fish it will be apparent that they are equally suitable for cutting frozen meat or other foods into strips or small fillets.

Thus it will be seen that I have provided an efficient attachment for insertion in a hydraulic press to enable subdivision of a slab of frozen fish, or the like, into small strips or fillets in the same operation that the slab is ejected from the die so as to enable simultaneous cutting of a large number of fillets in a single ejecting movement of the slab; furthermore I have provided a pair of knife units, one horizontally and the other vertically grilled, so that, side by side, they will effect cutting in horizontal and vertical directions to obtain any desired number and cross section of strips, and whereby other cross sections may be obtained either by removing certain of the knives or by substitution of other grilled units to obtain different sized fillets; furthermore, I have provided a cutter or stripper unit or units which are very strong and rigid so as to withstand excessive hydraulic forces caused by pushing of the frozen slab thereagainst.

While I have illustrated and described an embodiment of my invention, it will be understood that this is by way of illustration only, and that various changes and modifications may be made within the contemplation of my invention and within the scope of the following claim.

I claim:

In combination with a hydraulic press including a lower, stationary, and substantially U-shaped die and an upper, vertically movable, substantially U-shaped die having legs in confronting relationship with those of the lower die, for compressing a frozen slab of food in a transverse direction to provide a rectangular cross-section thereto, and including a longitudinally movable piston closely fitted inside said dies, and an end door for compressing said food in a longitudinal direction, and a pair of cutter units mounted within the press in side-by-side relationship between one of the end faces of said dies and said door, one of said cutter units comprising a plurality of horizontal, spaced, parallel, sharp knives and the other of said units comprising a plurality of vertical, spaced, parallel, sharp knives, said cutter units being in spaced, parallel, vertical planes and said knives having sharp leading and trailing edges for cutting the slab into strips as it is ejected longitudinally from the dies by said piston when said door is open.

References Cited in the file of this patent

UNITED STATES PATENTS

| | | |
|---|---|---|
| 276,326 | Atkins | Apr. 24, 1883 |
| 631,557 | Cayouette | Aug. 22, 1899 |
| 810,998 | Thomas | Jan. 30, 1906 |
| 958,639 | Hart | May 17, 1910 |
| 1,881,171 | Cooley | Oct. 4, 1932 |
| 2,310,604 | Zindrick | Feb. 9, 1943 |
| 2,565,245 | Lebovitz | Aug. 21, 1951 |